United States Patent [19]

Guillon et al.

[11] Patent Number: 4,907,269

[45] Date of Patent: Mar. 6, 1990

[54] PROCESS AND CIRCUIT LAYOUT FOR THE RECOGNITION OF AN IDENTIFICATION SIGN (SIGNUM) CONTAINED IN A VIDEO SIGNAL

[75] Inventors: Jean-Claude Guillon, Erstein; Patrick Daniel, Villingen, both of France

[73] Assignee: Deutsche Thomson-Brandt GmbH, Villingen-Schwenningen, Fed. Rep. of Germany

[21] Appl. No.: 251,645

[22] Filed: Sep. 29, 1988

[30] Foreign Application Priority Data

Sep. 30, 1987 [DE] Fed. Rep. of Germany ....... 3733013

[51] Int. Cl.$^4$ ............................................. H04N 17/00
[52] U.S. Cl. ........................................ 380/20; 380/23; 358/84; 358/86; 455/2; 455/3
[58] Field of Search ...................... 380/7, 10, 20, 23, 5; 455/26.1, 2, 3; 358/84, 86

[56] References Cited

U.S. PATENT DOCUMENTS 3,838,444  9/1974  Loughlin et al. ................ 172/5.2 R
4,319,273  3/1982  Nossem ............................ 380/20 X
4,620,219  10/1986  Burrowes ............................ 358/20

Primary Examiner—Stephen C. Buczinski
Assistant Examiner—Bernarr Earl Gregory
Attorney, Agent, or Firm—Joseph S. Tripoli; Eric P. Herrmann; James B. Hayes

[57] ABSTRACT

Circuitry for recognizing an authorization code included in a video signal for enabling a subscriber's television receiver, includes quantizing apparatus for coarsely quantizing the received signal. A correlator designed to recognize the authorization code is coupled the quantizer and produces an array of correlation values. The correlation values are coupled to a threshold circuit which converts the correlation values to bistate values. Further circuitry evaluates the distribution of bistate values to determine reception of the authorization code.

18 Claims, 4 Drawing Sheets

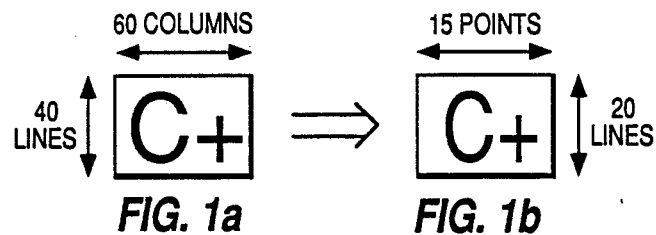
FIG. 1a   FIG. 1b
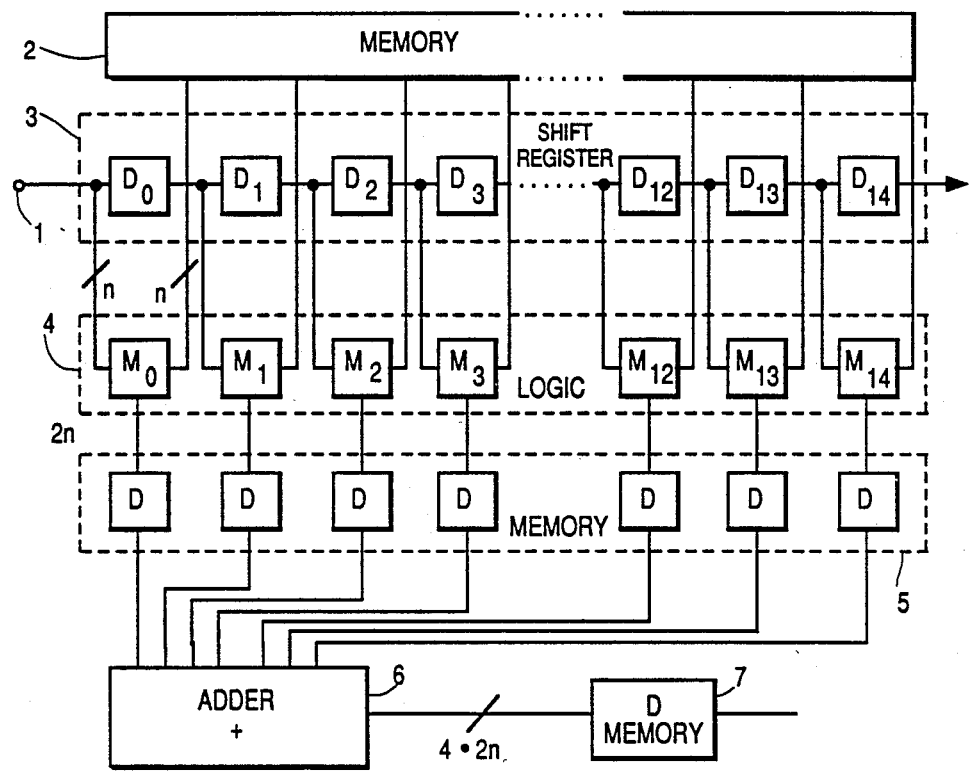
FIG. 2

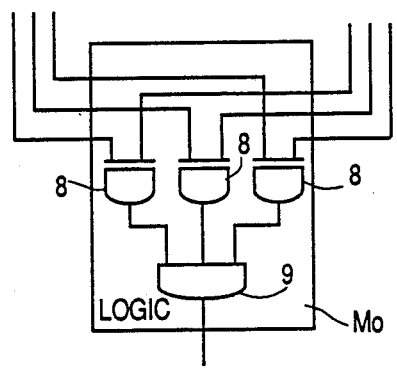
FIG. 3
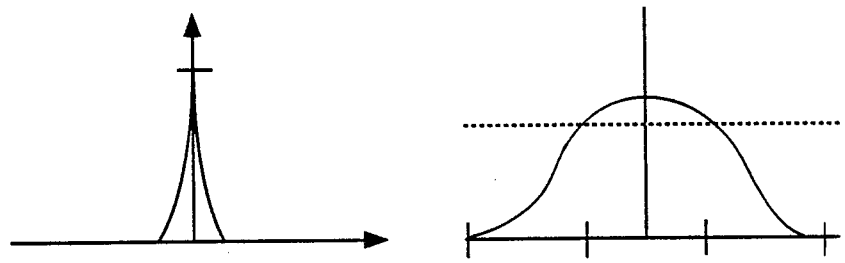
FIG. 5a  FIG. 5b
FIG. 6

PROCESS AND CIRCUIT LAYOUT FOR THE RECOGNITION OF AN IDENTIFICATION SIGN (SIGNUM) CONTAINED IN A VIDEO SIGNAL

This invention relates to pay-per-view television systems and more particularly apparatus for recognizing viewer authorization codes.

BACKGROUND OF THE INVENTION

In pay-per-view television systems, such as cable TV systems, which are operated by private broadcasters and funded by customer fees, it is desired to prevent unauthorized viewers from receiving particular programs. This is accomplished by transmitting programs in encoded form. Authorized customers are furnished with special decoders by the supplier of the programs for an appropriate fee. Such decoders, for example, may first evaluate a recognition code (designated herein as a signum) contained in the video signal, and only on recognition of the signum, enable the decoder to display the television image received in a decoded form.

In practice there exists the problems of being able to unequivocally recognize the signum despite corruption of the signal in order to allow authorized parties to receive the program but to disable the decoder if the signum is not present.

It is an object of the invention to create a process and circuitry which are capable of recognizing the signum even where signals suffer corruption.

SUMMARY OF THE INVENTION

The present invention includes circuitry in a receiver for recognizing authorization signals (signum) contained in a video signal. A correlator is coupled to examine the received video signal. The correlator compares the received signal with a reference corresponding to the authorization signal. Further circuitry evaluates the signal provided by the correlator to a predetermined signal distribution, and if the correlator output signal falls within the distribution the signum is recognized by the receiver.

BRIEF DESCRIPTION OF THE DRAWINGS

FIGS. 1a and 1b show an example of a signum and the area of the screen occupied by it;

FIG. 2 shows a block schematic diagram of apparatus for calculating a correlation function;

FIG. 3 shows an example of a combinatorial circuit in the block schematic diagram FIG. 2;

FIGS. 5a and 5b show the curves resulting from the correlation function in a case without disturbance and a case with disturbance;

FIG. 6 shows a chart with the values calculated under the correlation function.

DETAILED DESCRIPTION

Figure 4:
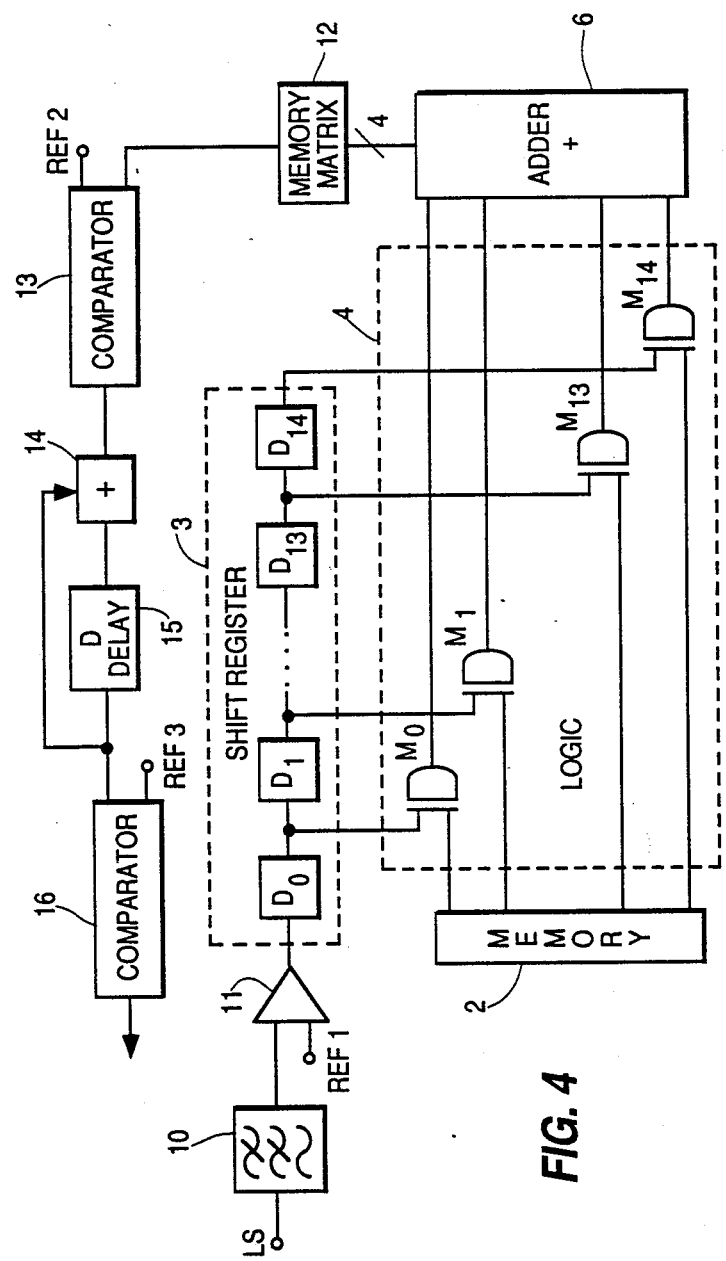
FIG. 4 shows a complete block schematic diagram for the evaluation of a signum.

Referring to FIG. 1a an example of a particular signum is illustrated. Depending upon the type of program to be received the signum may be located in either a portion of the image to be displayed or in the vertical or horizontal overscan region of the reproduced signal. The signum shown in FIGURE 1a is represented by a letter C together with a "+" sign. The dimensions of the signum occupy about forty lines with sixty picture elements per line, for a total of approximately 2400 picture elements. To process the signum, the signal is typically subsampled to about fifteen lines of 20 picture elements per line as illustrated in FIGURE 1b. The principle of signum detection is to compare the contents of the relevant portion of the received image to the contents stored in a memory. Nominally only the luminance component of the signal is utilized in the signum recognition process.

Signum recognition may be influenced by the following signal characteristics:
variations in signal amplitude;
corruption of the transmitted signal;
variations in the phase of the signal.

Protection against amplitude variations may be achieved by transmitting one or two white lines per field to establish a reference value for automatic gain control of the signal representing the signum. Another option is to average the results of the detection window over several such windows. A third option is to provide the signum as a high contrast luminance signal.

Protection against signal corruption, e.g., electrical noise, may be achieved by passing the received signal through low-pass filters and/or by expecting a particular event in a predetermined interval of the received signal. A further method of relatively reliably extracting the signum from a corrupted signal is by calculating a correlation function of the received signal with a predetermined reference signal.

Protection against phase variations may be accomplished by permitting only slight alterations in the video signal. This permits the use of a clock pulse generator for synchronization or, as in the above-mentioned instance, to make the calculations of the correlation function of the signal with a reference signal.

The following mathematical expression presents a correlation function suitable for the correlation of two different signals:

$$f_{xy}(k) = \lim_{R \to \infty} 1/2R \sum_{k=-R}^{R-1} x(i) y(i + k)$$

This formula indicates that each point of the correlation function represents the sum of the products of a pair of signals for a given phase value between the respective signals. The maximum value occurs when both signals share the same phase.

A suitable correlation circuit is illustrated in FIG. 2. In FIG. 2, the received signal, assumed to be in digital format and quantized to n-bit samples is applied to input terminal 1. The portion of the signal containing the signum is assumed to include 15 samples per line interval. The digitized input signal is correlated with reference values stored in a memory circuit 2. The correlation circuit includes a shift register 3 which contains a number of D-type flipflops stages D0-D14 into which the signals, i.e., the 15 signum samples per line, which are to be examined, are serially entered. Thus the number of D-flipflopss equals the number of signum samples per line. The memory circuit 2 includes 15 reference values for each line.

The input to each flipflop stage D0-D14 and a corresponding reference value output from memory circuit 2 are coupled to respective inputs of combinatorial circuits M0-M14 in a logic circuit arrangement 4. Each of the connections includes n conductors equal to the number, n, of bits by which each picture element is quantized. The combinatorial circuits may be multiplier circuits, the simplest being exclusive OR elements. The output connections of the combinatorial circuits M0–M14 are coupled to respective D-flipflopss in a memory arrangement 5. Output connections from the D-flipflopss of memory arrangement 5 are coupled to respective input connections of an adding circuit 6. In the adding circuit 6 the correlated values from the D-flipflopss in memory 5 are summed. If there is no coincidence the correlated values sum to zero and for complete coincidence the correlated values will sum to a value of 15 per bit and picture element.

The output of the adding circuit 6 is connected to an intermediate memory 7 which can temporarily store the sums for each line examined. Depending on the number n of the bits which are used for the determination of each picture element $4 \times 2 \times n$ lines are required at the output of the adding circuit 6.

FIG. 3 shows an arrangement of the combinatorial circuits M0–M14 wherein the number of bits, n, per sample is assumed to be 3. Here, the combinatorial circuit is constructed using exclusive OR circuits. Three exclusive OR circuits, 8, have first input terminals coupled to receive respective bits of the picture samples and have second input terminals coupled to receive corresponding bits of the reference values. The output connections of the three exclusive OR circuits are coupled to respective input terminals of a three-input AND gate 9 which provides a correlation output value.

FIG. 4 shows a complete block schematic diagram of circuitry for the evaluation of the signum. The analog video signal (or particularly the luminance component) LS is applied to a low-pass filter 10. Low pass filter 10 is designed to provide a cutoff frequency to preclude aliasing if the signal is sampled every four picture elements on alternate lines. Subsequently, the video signal is quantized by a comparator 11, into which a reference voltage is fed, in such a way that one point is described by one bit. The comparator 11 is followed by a shift register 3 consisting of 15 D-flipflops D0–14 whereby, as opposed to FIG. 2, the signals are retrieved at the outputs. The correlation is made with reference values which are stored in the memory 2. In the logic circuit arrangement 4, equivalence elements in the form of exclusive OR gates M0–M14 are provided, into which the output signals of the D-flipflopss of the shift register 3 and of the outputs of the memory 2 are fed. The outputs of the exclusive OR gates M0–M14 are coupled to an adding circuit 6 and from there to a memory 12.

The storage locations inside the memory 12 are arranged in a matrix in which the correlated values of 15 picture elements in the horizontal dimension and 20 lines in the vertical dimension are stored in the form of four bit words each. If, in correct phase, the phases of the digital input signal LS and the virtual reference signal created by the succession of reference values coincide, and the result will produce a maximum in the middle of each line. The analog representation of one line with no disturbance is shown in FIG. 5a by the narrow curve. If disturbances are present in the input signal, a bell shaped curve such as illustrated in FIG. 5b may be produced by the correlation.

A correct signum included in a corrupted signal may be distinguished from an incorrect signum by thresholding the values representing the bell shaped curve. That is, values on the curve which exceed a threshold value are allocated a value of one, and values below the threshold are allocated a value of zero. This thresholding is performed for each horizontal line of the matrix by a comparator 13. The correlated values contained in memory 12 are applied seriatum to a first input terminal of the comparator 13. The threshold value is applied to a second input terminal of the comparator 13 which provides a sequence of one and zero output values corresponding to the relative amplitude of the sequence of values applied to its first input terminal.

FIG. 6 illustrates a matrix of one and zero values, representing the matrix of values contained in memory 12, provided by the threshold comparator 13.

The matrix is partitioned into three zones Z1, Z2, Z3. If the threshold value is chosen correctly there should be only 0-values inside the lateral zones Z1 and Z3 of this matrix and only 1-values inside the center zone Z2. In practice this will not always be the case when, for example, disturbances in phase and/or in amplitude occur in the transmitted signal. Strong deviations will be apparent in this signal with respect to the reference signal. In this case 1-values may appear inside the lateral zones Z1 and Z3 and 0-values may be present inside the center zone Z2.

At a given error rate of e.g. 20 percent of the values contained in zones Z1, Z2 and Z3, the signum shall be deemed recognized as correct. Evaluation of the error rate is performed by adding circuit 14, delay circuit 15 and comparator 16. The one/zero values from comparator 13 are coupled to a first input of the adding circuit 14. The delay circuit 15 is coupled between the output and second input connections of the adding circuit 14 to form an integrator. The one/zero values representing the correlation sums are added zone by zone andline for line, and the results are coupled to the comparator circuit 16. The sums of the one/zero values for the respective zones are compared against a reference value Ref 3 which is coupled to a second input terminal of the comparator 16. The reference value Ref 3 is established at 20 percent below the maximum value which would result from a flawless video signal representing the signum. The status at the output of the comparator 16 is decisive for recognition or non-recognition of the signum. Thus the output signal of the comparator 16 can be utilized to control a subsequent decoder (not shown) to enable the decoder in case of signum recognition and to disable the decoder otherwise. The decoder is then capable of displaying the received video signal program in a manner free of interference.

Figure 7:
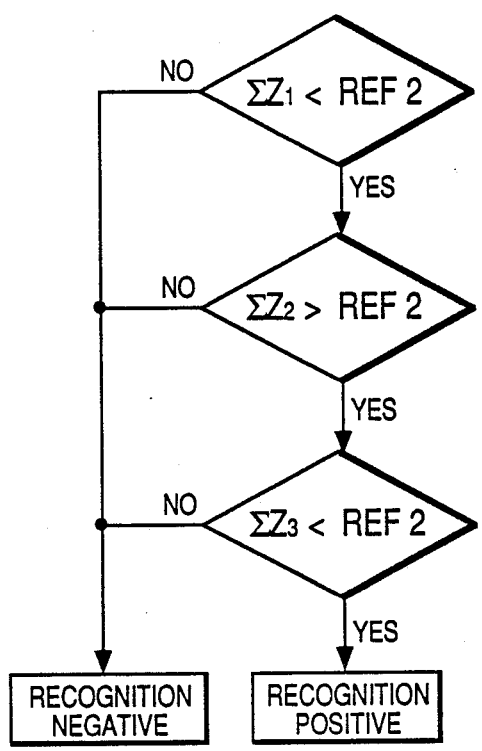
FIG. 7 shows a flow chart for the portion of the circuitry of FIG. 5 including circuit elements 14, 15 and 16.

FIG. 7 illustrates in the form of a flowchart, the comparison function performed by the comparator circuit 16. Here, the zones Z1, Z2 and Z3 are examined in thre steps; where the sum conditions are met, the signum is evaluated as recognized, in case of failure it is evaluated as not recognized.

What is claimed is:

1. A method for the recognition of an identification signum contained in a television video signal, comprising:
   providing a reference signal corresponding to said identification signum;
   providing a reference value;
   correlating a portion of said video signal containing said identification signum with said reference signal to produce a sequence of correlation values;
   comparing the sequence of correlation values against said reference value and indicating the occurrence of said identification signum on the occurrence of a predetermined distribution of comparison values.

2. The method according to claim 1 wherein said correlating step comprises forming a sum of products $f_{xy}(k)$ according to the function $$f_{xy}(k) = \lim_{R \to \infty} 1/2R \sum_{k=-R}^{R-1} x(i)y(i+k)$$

where x(i) corresponds to a sample of the video signal and y(i+k) corresponds to values of the reference signal.

3. The method according to claim 2 wherein the portion of the video signal containing the identification signum is correlated over a plurality of picture elements in each of a plurality of horizontal lines, the correlation being performed mutually exclusively for each horizontal line and the correlation values are temporarily stored in matrix form.

4. The method according to claim 1 wherein the portion of the video signal containing the identification signum is correlated over a plurality of picture elements in each of a plurality of horizontal lines, the correlation being performed mutually exclusively for each horizontal line and the correlation values are temporarily stored in matrix form.

5. The method set forth in claim 4 wherein the comparing step produces comparison values having first and second states for said correlation values being greater and less than said reference value respectively and the comparison values are temporarily stored in matrix form.

6. The method set forth in claim 5 further including:
providing further reference values;
partitioning said matrix into three zones; and
summing the number of comparison values in each zone having one of said first and second states to produce sums for each zone and comparing said sums to said further reference values to produce said indication.

7. The method set forth in claim 1 further including:
low pass filtering said video signal; and
coarsely quantizing low pass filtered video signal before correlating said portion of the video signal containing the identification signum.

8. Apparatus for detecting the presence of an identification sign contained in a television video signal, said apparatus comprising:
a terminal for receiving said video signal;
means for providing reference signal corresponding to said identification signum;
a correlator, coupled to said terminal and said means for providing reference signal, for correlating at least a portion of said video signal with said reference signal to produce correlation values;
means for providing a reference value; and
means, including comparing means, responsive to said correlation values and said reference value to produce a signal indicative of the occurrence of said identification signum.

9. The apparatus set forth in claim 8 wherein said correlator comprises:
a shift register having a plurality of output terminals for concurrently providing signals representing a plurality of picture elements;
a plurality of multipliers having respective first input terminals coupled to respective output terminals of said shift register and respective second input terminals coupled to said means for providing reference signal and having respective output terminals; and
an adder circuit having a plurality of input terminals coupled to respective output terminals of said plurality of multipliers for producing correlation values.

10. The apparatus set forth in claim 9 wherein said means including comparing means includes:
a comparator having first and second input terminals coupled to said adder circuit and said source of said reference value respectively and having an output terminal;
a delay element having an input terminal and an output terminal;
an adder having first and second input terminals respectively coupled to the output terminals of said comparator and said delay element respectively and having an output terminal coupled to the input terminal of said delay element; and
means, coupled to the output terminal of said adder, for producing said signal indicative of the occurrence of said identification signum in response to a predetermined distribution of values provided by said adder.

11. The apparatus set forth in claim 10 wherein said comparator is coupled to said adder circuit by memory means for storing a line of correlation values representing said portion of said video signal.

12. The apparatus set forth in claim 9 wherein said correlator is coupled to said terminal for receiving said video signal by circuitry comprising:
a low pass filter having an input terminal coupled to said terminal for receiving video signal and having an output terminal; and
means coupled to the output terminal of said low pass filter for producing a coarsely quantized digital signal representing low pass filtered video signal provided by said low pass filter.

13. The apparatus set forth in claim 8 wherein said correlator is coupled to said terminal for receiving said video signal by circuitry comprising:
a low pass filter having an input terminal coupled to said terminal, and having an output, said low pass filter having a cutoff frequency selected such that the signal provided by said low pass filter may be subsampled relative to the horizontal picture element rate and the vertical line rate without aliasing;
a source of a further reference value; and
a comparator having first and second input terminals coupled respectively to the output of said low pass filter and the source of further reference value, for producing a signal representing said video signal and having first and second states for signal provided by said low pass filter being greater and lesser than said further reference value respectively.

14. The apparatus set forth in claim 8 wherein said correlator is coupled to said terminal for receiving said video signal by circuitry comprising:
a low pass filter having an input terminal coupled to said terminal for receiving video signal and having an output terminal; and
means coupled to the output terminal of said low pass filter for producing a coarsely quantized digital signal representing low pass filtered video signal provided by said low pass filter.

15. Apparatus for detecting an identification signum included in an active portion of a television video signal, said apparatus comprising:

a signal input terminal for receiving said video signal;

means for providing a reference signal representing said identification signum;

a correlator coupled to said input terminal and responsive to said reference signal for generating an array of values representing the relative correlation between said video signal and said reference signal;

means responsive to said array of values for producing a further array of values representing said array of values, values in said further array having a first state if the corresponding value in said array is greater than a predetermined value and a second state otherwise; and means responsive to said further array of values for detecting a predetermined distribution of said first and second states of values of said further array, to generate a signal indicating the occurrence of said identification signum.

16. The apparatus set forth in claim 15 wherein said means for detecting a predetermined distribution includes:

means responsive to said further array of values for generating a plurality of sums of values from said further array, each of said plurality corresponding to a predetermined portion of said further array; and means for comparing said plurality of sums against respective predetermined values.

17. A method for generating a control signal indicating recognition of an identification signum contained in a portion of a television video signal comprising:

correlating said video signal with a reference representing said identification signum to produce a first array of correlation values;

comparing the correlation values of said array with a predetermined value to generate a second array of values, respective values in said second array having first or second states for the corresponding values in said first array being respectively greater or lesser than said predetermined value; and generating said control signal if the values in said second array satisfy a predetermined distribution of first and second states.

18. The method set forth in claim 17 wherein said step of generating said control signal comprises:

segmenting said second array into zones;

counting the occurrences of values having first or second states in the respective zones to produce count values for each zone; and comparing the count values against predetermined values.

* * * * *